United States Patent [19]
Rhodes, Jr.

[11] Patent Number: 5,161,819
[45] Date of Patent: Nov. 10, 1992

[54] TAMPER PROOF AIR BAG DOOR

[75] Inventor: Richard D. Rhodes, Jr., Somersworth, N.H.

[73] Assignee: Davidson Textron Inc., Dover, N.H.

[21] Appl. No.: 691,237

[22] Filed: Apr. 25, 1991

[51] Int. Cl.$^5$ .............................. B60R 21/16
[52] U.S. Cl. ........................... 280/728; 280/743
[58] Field of Search ........... 280/732, 743, 728, 730, 280/731

[56] References Cited

U.S. PATENT DOCUMENTS

| | | | |
|---|---|---|---|
| 3,708,179 | 1/1973 | Hulten | 280/732 |
| 4,878,689 | 11/1989 | Mitzkus et al. | 280/743 X |
| 4,893,833 | 1/1990 | DiSalvo et al. | 280/728 X |
| 4,964,653 | 10/1990 | Parker | 280/732 |

Primary Examiner—David H. Bollinger
Attorney, Agent, or Firm—Reising, Ethington, Barnard, Perry & Milton

[57] ABSTRACT

An interior trim product has an opening therein formed to overlie an air bag restraint assembly housed in the trim product. The air bag restraint assembly includes a canister for generating gas to inflate an air bag for deployment into the passenger compartment of a motor vehicle. The opening is closed by a door having a vinyl outer covering matching the aesthetic appearance of the outer surface of the interior trim product. First and second substrates formed in the interior trim product and on the door support two hook and loop fastener strips each of which is connected to one of the substrates to form a tamper proof connection for holding the door in place prior to air bag deployment.

4 Claims, 1 Drawing Sheet

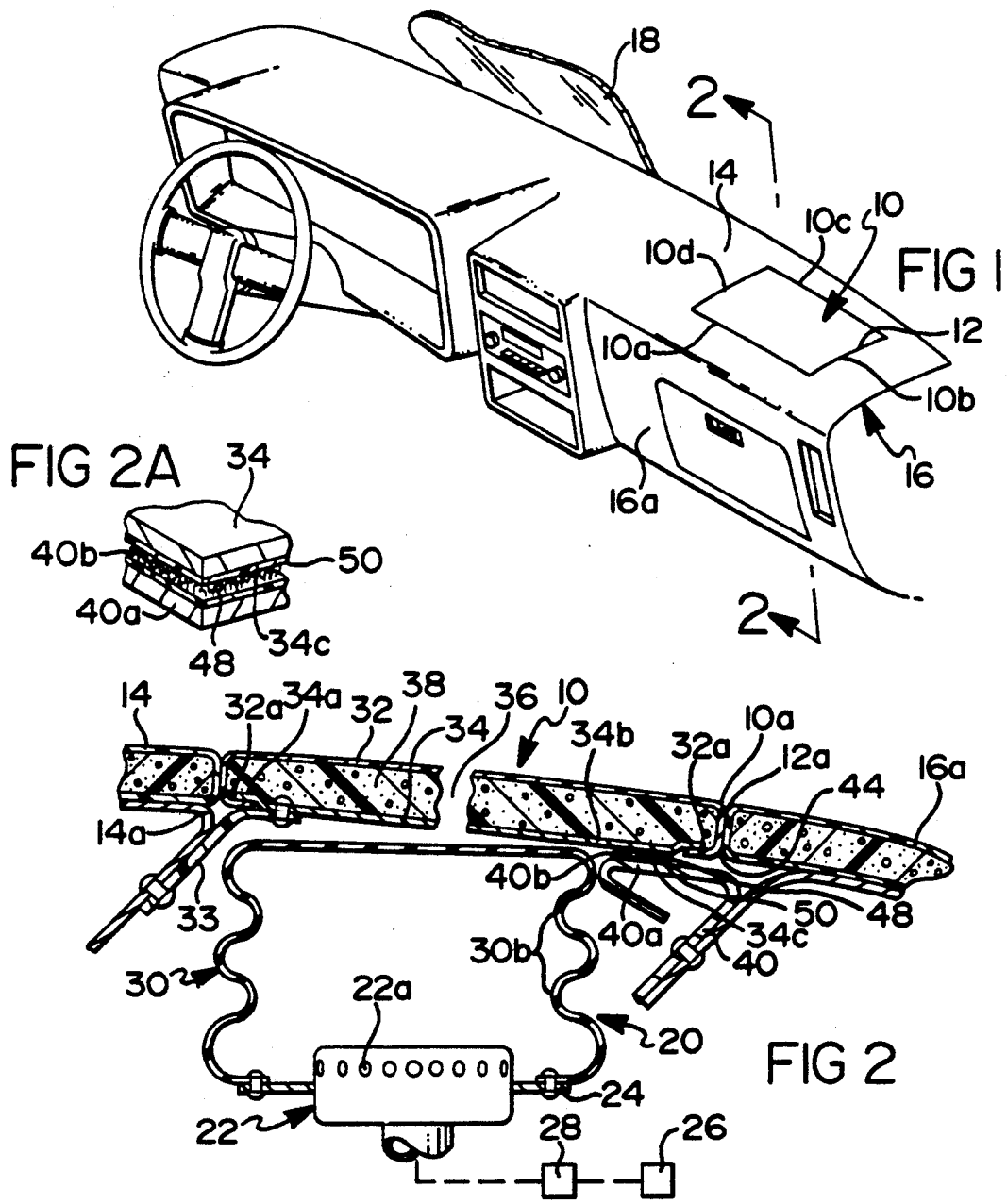
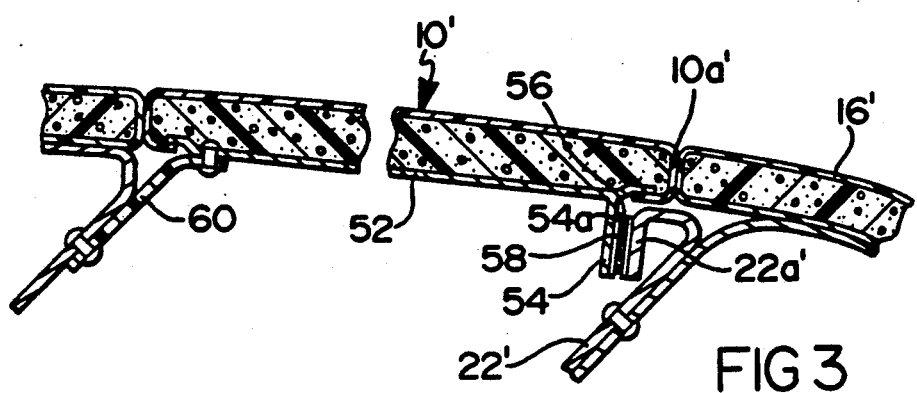

TAMPER PROOF AIR BAG DOOR

FIELD OF THE INVENTION

This invention relates to air bag restraint systems for use in motor vehicles and more particularly to such air bag restraint systems which are housed within an interior trim product of the vehicle behind or below an opening which is closed by a door that opens when an air bag is inflated.

BACKGROUND OF THE INVENTION

Air bag restraint systems require a cover which opens to provide a path for deployment of an air bag into the passenger compartment as it is inflated.

Some of the prior art pads or covers for air bag devices are not soft and do not match or conform to the styling and aesthetic requirements of an associated interior trim product in which the air bag restraint system is housed. Such covers are often formed from injection molded thermoplastic elastomers or thermoplastic olefins. While such materials are suitable for mid-mount locations such as on the front vertical surface of an instrument panel, they do not perform well if subjected to radiant heating, e.g., sunlight directed through a front windshield of a vehicle.

Other prior art pads or covers include a foamed interior which provide a soft feel and an outer skin of cast plastisol, e.g., polyvinyl chloride (PVC) or urethane skin, ABS/PVC/nitrile tripolymer vacuum formable sheet, dry cast polymer skins, or injection molded PVC, which can be aesthetically matched to the material of the outer surface of an interior product which houses the air bag restraint system.

Examples of such prior art pads or covers are shown in U.S. Pat. No. 3,708,179 which discloses mid-mounted doors formed of a layer of urethane foam and an outer cover of a plastisol skin material. The '179 structure is supported on a pair of spaced hinge pins for movement outwardly of the front vertical face of an instrument panel so as to permit deployment of an air bag into the passenger compartment at the passenger side of the front seat.

U.S. Pat. Nos. 4,946,653 and 4,893,833 disclose door configurations for closing an upper mount configured air bag restraint system wherein the door is located in an upper surface of an instrument panel and moved upwardly toward the windshield of the vehicle when the air bag is deployed.

One problem with such prior art systems has been how to hold down the rear edge (from the in car position) of the door adjacent the rear edge of the deployment opening in the interior trim product. In the case of top doors, the rear edge is located at a point where children can pry the door open unless it is firmly fastened in place by interlocking mechanical members. One problem with such interlocking structure is that it may not allow for a prompt and repeatable release of the door when an air bag is inflated to impact against the underside of the door. In such cases, the access door may not fully open and thereby may hinder unobstructed deployment of the air bag into the passenger compartment of a vehicle.

SUMMARY OF THE INVENTION AND ADVANTAGES

The subject invention is directed toward a door assembly for an opening through which an inflatable restraint device such as an air bag is deployed following vehicle impact. The door includes an outer plastisol (or dry cast vinyl thermoplastic molded particles; urethane; or vacuum formed ABS/PVC) skin and a foam interior so that it will conform to the styling, feel and aesthetic appearance of an associated interior trim product which covers the air bag restraint system. First and second substrates respectively formed on the interior trim product and the door are located closely adjacent the rear end of the door. Two hook and loop fastener strips are provided on the first and second substrates to define a specified hold down force. The hold down force is maintained over periods of use and variations in temperature extremes so as to assure release of the door to provide unobstructed deployment of the air bag into a passenger compartment when vehicle impact causes a gas generator to inflate the air bag. Each of the fastener strips is connected to one of the substrates to form a tamper proof connection for holding the door in place in the deployment opening prior to air bag deployment. The fastener strips are arranged to either release in tension or shear to allow for unrestrained movement of the door into an upwardly pivoted position between a windshield and the passenger compartment of a vehicle when a vehicle impact causes the air bag to be inflated for deployment into the passenger compartment.

An object of the invention is to provide a door closure for an air bag restraint system which is easy to manufacture and which will reduce foam and vinyl stress and debris formation during air bag deployment and which will enable standard substrate configurations to be used in the foam molding manufacture while providing a hold down connection at the rear end of a door and the rear end of an access opening closed by the door which will release through a wide range of temperatures and following protracted periods of use. The hold down connection is configured for ease of assembly and is operative to maintain the door tamper proof.

A further object of the present invention is to provide a door assembly for closing an opening in an interior trim component of a vehicle in which an inflatable air bag assembly is housed for deployment of an inflated air bag into the passenger compartment upon vehicle impact. The interior trim component has an outer covering of cast vinyl material (or urethane or vacuum formed stock) around the opening with styling grains and colors for providing an aesthetic appearance and including a backing of soft foam material. A closure panel for the opening has an outer cover of cast vinyl material (or the aforesaid equivalents thereof) with styling grains and colors corresponding to the outer covering of the interior trim component; the closure panel has a shape corresponding to the opening in the interior trim component and is fit into the opening for closing the opening and for preventing access to the air bag assembly; the closure panel has a first substrate and the interior trim product has a second substrate, both substrates located closely adjacent the rear edge of the opening and the rear edge of the closure panel and including hook and loops fasteners that are operative to hold the door in place within the opening with the same hold down effectiveness over a wide range of temperature conditions and for extended periods of use; the fasteners release at a specified force level when an air bag is inflated against the underside of the closure panel so as to separate the closure panel from the interior trim product when the air bag is inflated and deployed through the opening into the passenger compartment of a vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an instrument panel or dashboard which is one suitable interior trim product for housing and providing an opening for deployment of an inflatable restraint into the passenger compartment of a motor vehicle;

FIG. 2 is an enlarged sectional view of one embodiment of the invention taken along the line 2—2 of FIG. 1;

FIG. 2A is a broken fragmentary perspective view of a hook and loop fastener in the present invention; and FIG. 3 is an enlarged sectional view like FIG. 1 but showing attachment of a door closure assembly to a canister.

DESCRIPTION OF PREFERRED EMBODIMENTS OF THE INVENTION

Referring now to FIG. 1, a door or closure panel 10 for closing an opening to an inflatable restraint safety device is shown. In this embodiment of the invention, the door 10 is shown in a top mount position in which it is located within an opening 12 formed through the top surface 14 of a dashboard or instrument panel 16. The opening 12 has a rear edge 12a located adjacent the rear surface 16a of the instrument panel 16. Opening 12 has a front edge 12b located in underlying relationship to a sloped front windshield 18. While shown in the upper surface of the instrument panel, the opening could also be formed in the rear surface 16a in what is known as a mid-mount position. The top mount or mid-mount of the door assembly 10 depends upon the location of the underlying air bag restraint system 20. In the illustrated embodiment of FIG. 1, the air bag restraint system 20 includes a gas generator 22 located in a canister or casing 24 mounted on a suitable vehicle component not shown. The gas generator 22 has a plurality of openings 22a through which a suitable inflatant gas flows when an impact sensor 26 is actuated upon vehicle impact to condition a controller 28 to initiate gas generation all as is well known to those skilled in the art. The inflatant gas is directed into the interior of an inflatable air bag 30 connected at one end 30a to the casing 24 and having convolutions 30b which expand as the air bag is inflated to impact against the underside of the door 10 to cause it to pivot upwardly toward the windshield 18 to allow for deployment of the air bag 30 through the opening 12.

In accordance with the invention, the door assembly includes a vinyl outer cover 32 which can be formed from cast vinyl material by processes such as those set-forth in U.S. Pat. Nos. 4,664,864 and 4,784,911, both commonly assigned to the same assignee as in the present application and incorporated by reference herein. Such outer covers 32 have colors and grain appearances that are accurately matched to the appearance of the surface of an associated interior trim product such as the illustrated instrument panel. The vinyl outer cover 32 has edge portions 32a thereon formed over the peripheral edge 34a of a first construction substrate 34 of the type which is mounted on a lid of a foam mold apparatus such as illustrated and described in U.S. Pat. No. 4,806,094, commonly assigned to the same assignee as the present invention and also incorporated by reference herein. In accordance with the present invention, the substrate 34 has construction holes 34b which aid in its connection to standard mold apparatus lids and which will enable it to be located so as to form a sealed connection with respect to the outer cover 32 and to define a space 36 into which foam precursors are directed in a known manner for reaction to form a soft feel foam layer 38 behind the cover 32 such that a finished appearance will be formed at side surfaces 10a–10d of the door 10 and the outer cover 32 will be supported by the foam layer 38 to match the styling and appearance of a foamed interior trim product. The side surfaces 10a–10d conform to the shape of the opening 12 so that the door 10 will closely fit in the opening 12 where it seats on suitable recessed support surfaces 14a in the top surface 14 of the instrument panel 16.

In accordance with one feature of the present invention, the first substrate 34 is associated with a second substrate 40 located on the interior trim product represented by the instrument panel 16. It should be understood that the invention is equally suitable for use with other interior trim products such as steering wheels having a housing formed hereon for housing an air bag assembly.

In the past, various mechanical interlocks have been proposed to hold a door assembly 10 within an opening for extended periods of time. Such mechanical interlocks have presented problems of how to hold the rear edge of the door closely within the interior trim product so as to hide access to the interlocks to prevent inadvertent or intentional tampering. Another problem is that the interconnection between the door assembly and the interior trim product requires precision alignment of the interlocking components. A disadvantage of such arrangements is that the position of the interlocking components can change at different temperatures because of differential thermal expansion between the mounts for the interlocking components. Such misalignment can change the release force required to open the door when an air bag is inflated. A tether 33 is secured between the front edge 10c and a retainer 14a on the instrument panel 16 to control upward pivotal movement of the door 10.

In accordance with the present invention, the first substrate 34 is a standard substrate used in forming a foam molded part having an outer vinyl skin. The substrate 34 has a surface 34c thereon defining a support surface located closely adjacent the rear edge of the door 10 immediately inboard of a breakline 44 formed between the underside of the rear edge 10a and the rear edge 12a at the rear 16a of the instrument panel 16. As shown in FIG. 2A, a first strip 48 of either hook or loop tear apart fastener sold under the trademark Velcro by Velcro U.S.A. Inc., Manchester, N.H., is bonded to the surface 34c to face downwardly therefrom. Such releasable tear apart fasteners are configured such that the release force can be controlled, either in tension or shear, by the interfacing area between the hook and loop components. Other equivalent type tear apart fasteners such as those with a pin and knob interface are equally suitable for use with the invention. The second substrate 40 has an inwardly directed flange 40a formed thereon defining a support surface 40b on which is connected a second strip 50 of a loop or hook fastener like that in the strip 48 but having the connecting features thereon adapted to mate and fasten to those on the strip 48, e.g., when the strip 48 has loops the strip 50 has hooks and vice-versa. The fastener strips 48, 50 hold the rear edge 10a of the door assembly 10 against the upper edge 46 so that the breakline 44 is no more than a slight recess which remains almost hidden so that a child will not be able to pry the door upwardly. The retention force defined by the interconnected strips 48, 50 remains the same over a wide range of operating temperatures and the retention force therebetween remains the same (or improves when subject to vibration) for extended periods of time notwithstanding that the door assembly 10 and instrument panel 16 are subject to a wide range of forces and vibrations during use. Accordingly, a specified force required to release the door assembly 10 can be maintained at a predetermined interfacing connection area between the strips 48, 50. The selected interfacing area can be tailored to a particular interior trim product, canister and air bag design to assure that the door assembly will open at the specified force when the air bag is inflated thereby to assure quick and unobstructed deployment of the air bag into the passenger compartment. In the embodiment of FIG. 2, the release is by a tensile force which in certain applications would be in the order of 30 psi to provide a desired tamper proof hold down force for typical instrument panel applications of the type shown in FIG. 1 while providing desired door separation when the air bag 30 is inflated.

In the embodiment of FIG. 3, a shear force separation application is illustrated wherein a door assembly 10' has a construction substrate 52 with a dependent flange 54 located closely adjacent the rear edge 10a' of the door assembly 10'. The flange 54 defines a support surface 54a on which a hook or loop plastic fastener strip 56 is bonded. The flange 54 faces the inside upper edge 22a' of a canister 22' The upper edge 22a' has a second hook or loop plastic fastener strip 58 bonded thereto and the strips 56 and 58 respectively have loops/hooks or the reverse which apply a force that will hold the rear end of the door assembly closely adjacent to or against the upper edge of the rear of the instrument panel 16' for purposes discussed in the description of the operation of the embodiment of FIG. 2. In this embodiment the release force is in shear in an instrument panel application as shown in FIG. 1, the shear force would be in the order of 100-150 psi which will provide a tamper proof retention force but which will be opened in the same manner as the first embodiment when an air bag is inflated to impact against the underside of the door assembly 10'. The impact will cause door separation when the air bag impacts on the underside of the door to allow the rear edge 10a of the door assembly to freely release from the instrument panel so that the door assembly 10 will quickly open by pivotal movement about a front hinge flange 60 connected to a retainer on the main pad of the instrument panel.

The door assembly of the subject invention thereby provides a soft skin door that is easily matched to adjacent interior trim products having foamed in place material and wherein the door assembly can be formed by standard foam molding apparatus without requiring special modifications to substrate components or without requiring modification of the lid for carrying such substrates during the foam molding of the door. A second substrate on the interior trim product and the door substrate are associated with a fastener construction which will separate without formation of debris during door opening while provide a temperature and vibration insensitive hold down force so that the door is tamper proof while being easily and quickly released. While the invention is shown in association with a door mounted in a dashboard or instrument panel, it is equally suitable for use with other interior trim products such as driver side steering wheel housings. The arrangement is manufactured not only with standard equipment practicing standard processing steps, it enables the door to be used in a more cost effective manner than the assemblies in the prior art.

The invention has been described in an illustrative manner, and it is to be understood that the terminology which has been used is intended to be in the nature of words of description rather that of limitation.

Obviously, many modifications and variations of the present invention in light of the above teachings may be made. It is, therefore, to be understood that within the scope of the appended claims, the invention may be practiced otherwise than as specifically described.

What is claimed is:

1. A door assembly for closing an opening in an interior trim component of a vehicle in which an inflatable air bag assembly is housed for deployment of an inflated air bag into the passenger compartment upon vehicle impact comprising:

said interior trim component having an outer covering around the opening having styling for providing an aesthetic appearance;

a closure panel having an outer cover with styling corresponding to the outer covering of said interior trim component; said closure panel having a shape corresponding to the opening in said interior trim component and being fit into said opening for closing the opening and for preventing access to said inflatable air bag assembly;

said closure panel having a substrate; said closure panel including a first component of a hook and lop tear away fastener thereon; and a second substrate located at a rear end of said opening and a second component of said hook and loop tear away fastener thereon mating with said first component of said hook and loop tear away fastener for holding said closure panel against said interior trim component for preventing inadvertent tampering and separation of the closure panel form said opening prior to deployment of said air bag.

2. A door assembly for closing an opening having a rear end, and sides formed in an interior trim component of a vehicle in which an inflatable air bag assembly is housed for depolyment of an inflated air bag into the passenger compartment upon vehicle impact comprising:

said interior trim component having an outer covering providing an aesthetic appearance;

a closure panel having an outer cover with an appearance corresponding to the outer covering of said interior trim component; said closure panel having a shape corresponding to the opening in said interior trim component and being fit into said opening for closing the opening and access to said inflatable air bag assembly;

said closure panel having a first substrate and including a depending flange portion thereon;

a second substrate located adjacent a rear end of said opening and a hook and loop tear away fastener; said hook and loop tear away fastener having first and second components connected respectively to said first and second substrates adjacent said rear end of said opening for securing said closure panel within said access opening to prevent tempering and unauthorized access to the air bag assembly.

3. A door assembly for closing an opening having a rear edge, a front edge located adjacent a windshield and having side edges in an interior trim component of a vehicle in which an inflatable air bag assembly is housed for deployment of an inflated air bag into the passenger compartment upon vehicle impact comprising:

said interior trim component having an outer covering around the opening having styling for providing an aesthetic appearance;

a closure panel having an outer cover corresponding to the outer covering of said interior trim component; said closure panel having a shape corresponding to the opening in said interior trim component and being fit into said opening for closing the opening and for preventing access to said inflatable air bag assembly said closure panel having and first and second substrates connected respectively to said closure panel and said interior trim component forming attachment surfaces closely adjacent the front edge of said access opening; and hook and loop tear away fastener means connected between said attachment surfaces for holding a rear end of said closure panel within said interior trim component to prevent prying of said hook and loop tear away fastener means from exteriorly of said closure panel to assure that the access opening remains closed until said air bag is deployed; said hook and loop tear away fastener means arranged to separate in tension upon inflation of said air bag for separating said closure panel from said interior trim component at said rear edge of said opening when said air bag is inflated for causing said closure panel to pivot upwardly while providing for unobstructed deployment of an air bag through said opening into the passenger compartment of a vehicle between the windshield and an occupant of the vehicle.

4. A door assembly for closing an opening having a rear edge, a front edge located adjacent a windshield and having side edges in an interior trim component of a vehicle in which an inflatable air bag assembly is housed for deployment of an inflated air bag into the passenger compartment upon vehicle impact comprising:

said interior trim component having an outer covering around the opening for providing an aesthetic appearance;

a closure panel having an outer cover corresponding to the outer covering of said interior trim component; said closure panel having a shape corresponding to the opening in said interior trim component and being fit into said opening for closing the opening and for preventing access to said inflatable air bag assembly;

first and second substrates connected respectively to said closure panel and said interior trim component forming attachment surfaces closely adjacent the front edge of said access opening; and hook and loop tear away fastener means connected between said attachment surfaces for holding a rear end of said closure panel within said interior trim component to prevent prying of said hook and loop tear away fastener means from exteriorly of said closure panel to assure that the access opening remains closed until said air bag is deployed; said hook and loop tear away fastener means arranged to separate in shear upon inflation of said air bag for separating said closure panel from said interior trim component at said rear edge of said opening when said air bag is inflated for causing said closure panel to pivot upwardly about said hinged connection to partially cover a windshield while providing for unobstructed deployment of an air bag through said opening into the passenger compartment of a vehicle between the windshield and an occupant on the passenger side of the vehicle.

* * * * *